(12) United States Patent
Hogan

(10) Patent No.: US 6,936,989 B2
(45) Date of Patent: Aug. 30, 2005

(54) PULSE COUNT MOTOR CONTROL DEVICE

(75) Inventor: Michael Patrick Hogan, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/216,151

(22) Filed: Aug. 9, 2002

(65) Prior Publication Data

US 2004/0027087 A1 Feb. 12, 2004

(51) Int. Cl.⁷ ............................................... G05B 9/18
(52) U.S. Cl. ........................ 318/569; 318/34; 318/599; 318/600; 701/33; 701/36; 701/102; 363/41
(58) Field of Search ............................... 318/569, 599, 318/600, 34, 111, 112, 113, 603, 563.11, 567; 701/33, 36, 102, 29, 49; 363/41; 370/464; 73/1.11, 1.75

(56) References Cited

U.S. PATENT DOCUMENTS

| | | | | |
|---|---|---|---|---|
| 4,287,503 A | * | 9/1981 | Sumida ........................ 340/461 |
| 4,478,274 A | * | 10/1984 | Naganoma et al. ......... 165/204 |
| 4,644,232 A | * | 2/1987 | Nojiri et al. .................. 318/66 |
| 4,739,323 A | * | 4/1988 | Miesterfeld et al. ...... 340/825.5 |
| 4,755,070 A | * | 7/1988 | Cerutti ..................... 400/144.2 |
| 5,087,864 A | * | 2/1992 | Abel ............................ 318/34 |
| 5,089,759 A | * | 2/1992 | Miotke et al. .......... 318/568.11 |
| 5,113,218 A | * | 5/1992 | Morikawa et al. ............. 355/56 |
| 5,481,456 A | * | 1/1996 | Ogura ........................... 701/1 |
| 5,670,855 A | * | 9/1997 | Okunishi ..................... 318/696 |
| 5,708,338 A | * | 1/1998 | Cook et al. ................. 318/466 |
| 5,742,143 A | * | 4/1998 | Katagiri ..................... 318/625 |
| 5,832,397 A | * | 11/1998 | Yoshida et al. ............... 701/29 |
| 6,243,635 B1 | * | 6/2001 | Swan et al. .................... 701/49 |
| 6,300,937 B1 | * | 10/2001 | Rosenberg .................. 345/156 |
| 6,380,575 B1 | | 4/2002 | Radens ....................... 257/296 |
| 6,522,664 B1 | * | 2/2003 | Kawahara ................... 370/466 |
| 6,583,591 B2 | * | 6/2003 | Echols et al. ............... 318/112 |
| 2003/0155428 A1 | * | 8/2003 | Fiegle et al. ............... 236/49.3 |

FOREIGN PATENT DOCUMENTS

EP 0775063 B1 * 5/1997

* cited by examiner

Primary Examiner—Rita Leykin
(74) Attorney, Agent, or Firm—Stefan V. Chmielewski

(57) ABSTRACT

A pulse count motor control device that connects to a central control unit through a first interface and to at least one motor through a second interface. A microprocessor integrated into the motor control device then allows it to directly monitor and drive the motor or motors in accordance with pulse count technology methods.

23 Claims, 1 Drawing Sheet

PULSE COUNT MOTOR CONTROL DEVICE

TECHNICAL FIELD OF THE INVENTION

The present invention relates generally to the precise control of a motor, and, more specifically, to a new device for controlling a motor through pulse count technology.

BACKGROUND OF THE INVENTION

Precise control of some motor designs is possible using pulse count technology. According to this position feedback technique, a system monitors brush commutation pulses or current spikes generated during the rotation of the motor. These detected pulses are then appropriately processed and counted, with the results sent to a controller that can then accurately determine and adjust the position of the motor shaft.

Unlike other motor control methods where the drive circuitry is often integrated with each motor, pulse count control is typically implemented through a centralized processor where it can be used to control multiple motors. Due to the large amount of processing, associated drive circuitry, and software required to implement the pulse count control of a motor, this integration through a centralized processor is typically chosen over integrating the drive circuitry into each individual motor as the latter becomes highly inefficient and not cost effective. This arrangement where the pulse count processing and motor drive circuitry are incorporated into a central processor or controller is illustrated in FIG. 1. Once the pulse count system is incorporated, the central controller 10 is wired directly to the motors 20A–20E that are to be controlled. One example of this typical arrangement can be found in automotive applications, where pulse count control is often desired for motors that are part of the heating, ventilation and air conditioning (HVAC) system of a vehicle. The typical HVAC system relies upon a centralized control head to oversee the operation and control of the system. This typical centralized control head contains the circuitry and programming required to coordinate the operation of the various subsystems of the HVAC system, along with control inputs that allow a vehicle occupant to activate and adjust the various systems, i.e. turn on the heater and increase the temperature of the vehicle interior. With the addition of pulse count control to the HVAC system, the centralized control head must be expanded to further include the pulse count control processor and motor drive circuitry needed to operate the various motors of the system.

However, difficulties arise due to the incorporation of the pulse count processing and motor drive circuitry into a centralized control head. Returning to the automotive example, the placement of the pulse count processing functions and motor drive circuitry within a central control head leads to the requirement that a relatively expensive microprocessor be used in the control head. Specifically, the control head has its own programming and processing requirements to execute. With the addition of the programming and processing requirements called for by the pulse count control system, the processing demands on the control head increase to the point that it requires a relatively powerful, and thus expensive, microprocessor in order for it to carry out its duties.

Beyond hardware costs, the incorporating of the pulse count processing and motor drive circuitry into a centralized control head leads to increased production costs due to the extreme variability between control heads of different vehicles. All vehicles can benefit from the use of pulse count technology to control the motors associated with its various systems. However, almost every type of vehicle has its own unique control head that has been designed or modified to meet the specific requirements of that vehicle type. Thus the control head for an automobile manufactured by Chrysler can be very different from the control head for an automobile manufactured by Ford. Similarly, the control heads for different vehicle models by the same manufacturer can be significantly different. As a result, there is no simple and standardized way to incorporate the circuitry and programming of a pulse count control system into a control head. For every different control head, or any time a design change is made to a control head, the pulse count control system has to be re-engineered to accommodate the existing differences or new changes. This results in significant time and expense associated with the process of incorporating a pulse count control system into a vehicle.

This excessive time and effort required to incorporate a pulse count control system into a vehicle also often prevents certain classes of customers from being able to obtain pulse count technology. For example, due to the wide variances in control heads, a manufacturer of pulse count motor control systems normally has to allocate significant time and resources into engineering a control system for each specific customer. As a result, it is not economically viable for the manufacturer to allocate the resources for small volume programs or customers. Thus the manufacturer is restricted in its ability to satisfy the demands of certain customers.

Therefore, the inventor hereof has recognized the need for a new device and method for implementing a pulse count motor control system that avoids the above restrictions.

DETAILED DESCRIPTION OF AN EMBODIMENT OF THE INVENTION

Figure 1:
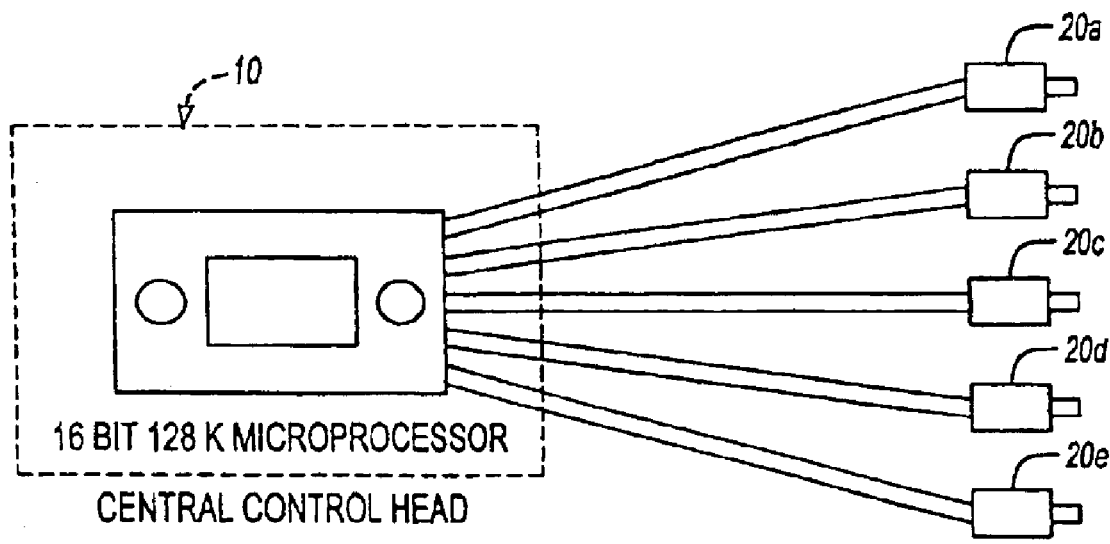
FIG. 1 illustrates a conventional pulse count motor control system.
Figure 2:
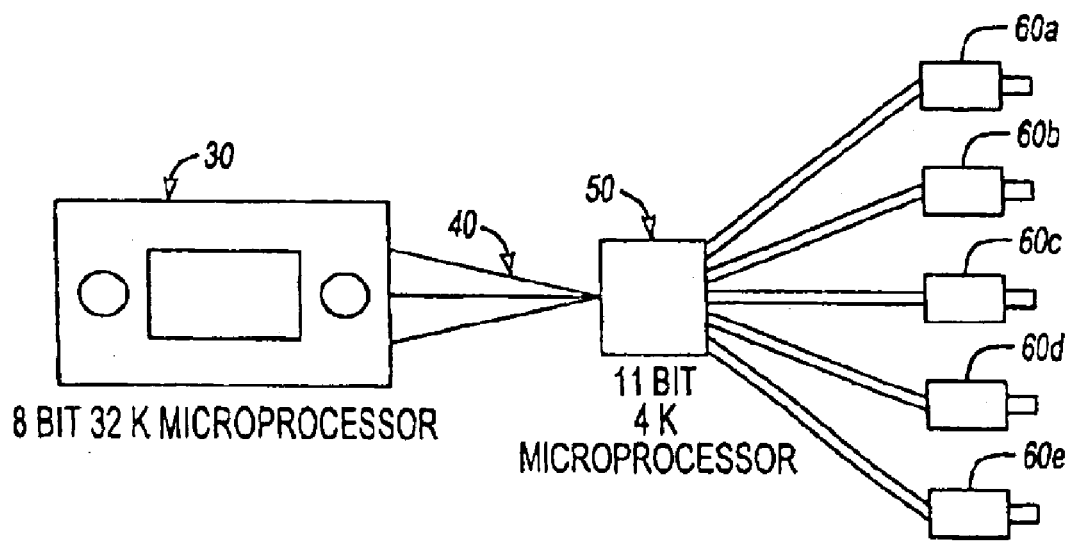
FIG. 2 illustrates a pulse count motor control system according to an embodiment of the present invention.

FIG. 2 illustrates one embodiment of a pulse count motor control system in accordance with the present invention. A central controller or processor 30, such as a control head of an automobile HVAC system, is connected to a pulse count control module 50 through a data bus 40. The control module 50 is then connected to one or more motors 60A–60E whose operation is to be controlled in accordance with pulse count monitoring.

The data bus 40 can be any type of data communication network or connection allowing bi-directional exchange of information between the central controller 30 and control module 50. For instance, in the automotive HVAC example, data bus 40 could be a serial peripheral interface (SPI) bus or a controller area network (CAN) bus that is frequently used in automobiles.

In the present example, motors 60A–60E are standard DC motors. However, any type of motor could be utilized in conjunction with the present invention as long as it is compatible with pulse count technology.

According to the present embodiment, a central controller 30 is no longer necessary to directly operate and control motors 60A–60E. Instead, this is now the job of the control module 50, which contains all of the processing and motor drive circuitry necessary to monitor and drive the motors connected to it. For example, in an automobile HVAC system, the control head, which previously would have functioned as the central controller 30, now simply oversees the system and issues general operating instructions. Based on these instructions issued by the control head, the control module 50 determines the desired state of motors 60A–60E. The control module 50 then selectively drives motors 60A–60E so as to place them in the appropriate state of compliance.

For a specific example, consider a vehicle in which the occupant has just placed, by means of the control head, the HVAC system into a defrost mode where heated fresh air is directed to the windshield. Initiated by the signals transmitted by the control head, the control module 50 determines that the motor-controlled vent that permits outside air into the car is currently closed, as are the vents that direct air to the windshield. The control module then begins to drive the motors associated with these vents so as to place them in an open state. Then through pulse count monitoring, the control module can determine when the motors have reached a position that equates to the vents being open, and at this point, stops driving them.

Several advantages are obtained by the invention embodied above. By removing the processing and motor drive circuitry from the central controller and placing them into independent control module 50, the required bandwidth or processing demands placed upon the central controller significantly decreases. Accordingly, a high power microprocessor is no longer required for the central controller. Instead, two less powerful microprocessors can be utilized, one for the central controller and one for the control module. For instance, in the automobile HVAC example, the original control head required a 16 bit, 128 k microprocessor. With the use of a control module in accordance with the present invention, the control head 30 now can function with simply an 8 bit, 32 k microprocessor, while an 11 bit, 4 k processor is used in the control module 50. This reduces costs because two low-end microprocessors often cost less than a single, more powerful processor. Further, this division and use of two low-end devices provides for increased design flexibility.

Beyond decreased hardware costs, the present invention also alleviates many of the problems caused by the wide differences that exist among central controllers such as HVAC control heads. By using an independent control module, no significant expenditure of time or effort is necessary to engineer the pulse count system for incorporation into a specific type of central controller. Instead, by providing a uniform interface to the pulse count system, the control module permits a variety of different central controllers to access and control a motor with little or no modification. This leads to significant decreases in engineering effort and production costs, and allows a manufacturer of pulse count control systems to supply smaller customers without having to commit significant engineering resources.

While the examples provided in the embodiment above focused on the use of the present invention with an automobile HVAC system, the control module can be beneficially used in a multitude of settings both inside and out of a vehicle. For example, beyond HVAC, other uses associated with an automobile include power mirrors, power seats, windows and sunroofs, along with various power-assisted driver controls such as adjustable foot pedals and adjustable steering columns. Outside of an automobile, the pulse count control module can be beneficially used in virtually any situation that requires precise control of a motor by pulse count technology.

Based on the targeted application, the abilities of the pulse count control module can also be expanded beyond precision motor control. For instance, motor calibration and diagnostic functions typically reside in the central control head. However, according to a further embodiment of the present invention, these calibration and diagnostic functions can be removed from the central control head and integrated into the control module. This further reduces the level of sophistication required in a control head, thereby decreasing costs while increasing flexibility and uniformity among control heads.

While the invention has been specifically described in connection with certain specific embodiments thereof, it is to be understood that this is by way of illustration and not of limitation, and the scope of the appended claims should be construed as broadly as the prior art will permit.

What is claimed is:

1. A motor control system, comprising:
   a plurality of motors that operate by pulse count technology:
   a pulse count motor control module including a motor pulse count microprocessor and pulse count motor drive circuitry that is connected to and directly operates and monitors pulse count control of the plurality of motors; and
   a central control unit including a microprocessor that provides general operating instructions to the pulse count control module, such that the pulse control module determines the state of the motors,
   wherein said pulse count control module further includes diagnostic and calibration functions for monitoring and calibrating said at least one motor.

2. The motor control system according to claim 1, wherein said motor control system is used within a vehicle.

3. The motor control system according to claim 2, wherein said at least one motor is part of a heating, ventilation and air conditioning (HVAC) system of said vehicle.

4. The motor control system according to claim 2, wherein said at least one motor is used to control a vehicle window.

5. The motor control system according to claim 2, wherein said at least one motor is used to control a vehicle sunroof.

6. The motor control system according to claim 2, wherein said at least one motor is used to control a position of a seat.

7. The motor control system according to claim 2, wherein said at least one motor is used to control a vehicle mirror.

8. The motor control system according to claim 2, wherein said at least one motor is used to control a power-assisted driver control.

9. The motor control system according to claim 8, wherein said power-assisted driver control comprises an adjustable foot pedal.

10. The motor control system according to claim 8, wherein said power-assisted driver control comprises an adjustable steering column.

11. The motor control system according to claim 1, wherein count control module is connected to said central control unit through a data communication network.

12. The motor control system according to claim 11, wherein said data communication network is a serial peripheral interface (SPI) bus.

13. A pulse count motor control device, comprising:
    means for program-controlled communicating with a central control unit; and
    means for program-controlled communicating with at least two motors, wherein each motor is controlled by a pulse count control module, wherein said central control unit issues general operating instructions for controlling a system that includes said at least two motors, and based on these general operating instructions, said pulse control module determines a state for said at least two motors so as to divert control over said at least two motors from the central control unit to the pulse count control module, and wherein the motor control device further comprises means for diagnosing and calibrating said at least one motor in communication with said count control module.

14. The motor control device according to claim 13, wherein said count control is used within a vehicle.

15. The motor control device according to claim 14, wherein said at least one motor is part of a heating, ventilation and air conditioning (HVAC) system of said vehicle.

16. The motor control device according to claim 14, wherein said at least one motor is used to control a vehicle window.

17. The motor control device according to claim 14, wherein said at least one motor is used to control a vehicle sunroof.

18. The motor control device according to claim 14, wherein said at least one motor is used to control a position of a seat.

19. The motor control device according to claim 14, wherein said at least one motor is used to control a vehicle mirror.

20. The motor control system according to claim 14, wherein said at least one motor is used to control a power-assisted driver control.

21. The motor control system according to claim 20, wherein said power-assisted driver control comprises an adjustable foot pedal.

22. The motor control system according to claim 20, wherein said power-assisted driver control comprises an adjustable steering column.

23. The motor control device according to claim 13, wherein said means for communicating with said central control unit includes a data communication network.

* * * * *